United States Patent
Beyer et al.

(10) Patent No.: US 11,913,507 B2
(45) Date of Patent: Feb. 27, 2024

(54) DISC BRAKE, IN PARTICULAR FOR UTILITY VEHICLES

(71) Applicant: WABCO EUROPE BVBA, Brussels (BE)

(72) Inventors: Frank Beyer, Mannheim (DE); Jochen Frank, Ludwigshafen (DE); Hans-Christian Jungmann, Gorxheimertal (DE); Marcel Kalmbach, Ilsfeld (DE); Marcus Keller, Weinheim (DE); Peter Moser, Waibstadt (DE); Martin Müller, Mannheim (DE); Vitalij Scherer, Leimen (DE); Mirko Seip, Brombach (DE); Markus Stafflinger, Bensheim (DE)

(73) Assignee: ZF CV Systems Europe BV, Brussels (BE)

( * ) Notice: Subject to any disclaimer, the term of this patent is extended or adjusted under 35 U.S.C. 154(b) by 450 days.

(21) Appl. No.: 17/098,945

(22) Filed: Nov. 16, 2020

(65) Prior Publication Data

US 2021/0062876 A1    Mar. 4, 2021

Related U.S. Application Data

(63) Continuation of application No. 16/078,410, filed as application No. PCT/EP2017/000412 on Apr. 4, 2017, now Pat. No. 10,837,506.

(30) Foreign Application Priority Data

Apr. 13, 2016    (DE) .......................... 102016004516.7

(51) Int. Cl.
*F16D 55/2265*    (2006.01)
*F16D 65/097*    (2006.01)
(Continued)

(52) U.S. Cl.
CPC .......... *F16D 55/2265* (2013.01); *B60T 1/065* (2013.01); *F16D 55/226* (2013.01);
(Continued)

(58) Field of Classification Search
CPC ............. F16D 65/0975; F16D 65/0977; F16D 65/0978; F16D 65/0973; F16D 65/18;
(Continued)

(56) References Cited

U.S. PATENT DOCUMENTS 2,568,858 A    9/1951  Kovac
3,243,017 A *  3/1966  Kleinstuck ............ F16D 65/097
                                                188/72.3

(Continued)

FOREIGN PATENT DOCUMENTS

DE    2934177 A1    3/1980
DE    4119928 A1    12/1992
(Continued)

OTHER PUBLICATIONS

Search Report from corresponding German application No. 2015E00147DE dated Mar. 3, 2017 (9 pages).

*Primary Examiner* — Robert A. Siconolfi
*Assistant Examiner* — San M Aung
(74) *Attorney, Agent, or Firm* — Dickinson Wright PLLC (57) ABSTRACT

A disc brake for utility vehicles includes a brake disc, a first brake lining on a first side of the brake disc and a second brake lining on a second side of the brake disc opposite the first side. A spreading device is also provided which generates a force that moves the first and the second brake lining away from one another.

16 Claims, 11 Drawing Sheets

(51) Int. Cl.
*F16D 55/226* (2006.01)
*B60T 1/06* (2006.01)
*F16D 55/00* (2006.01)
*F16D 127/02* (2012.01)
*F16D 129/04* (2012.01)

(52) U.S. Cl.
CPC ..... *F16D 65/0973* (2013.01); *F16D 65/0975* (2013.01); *F16D 65/0978* (2013.01); *F16D 2055/0016* (2013.01); *F16D 2127/02* (2013.01); *F16D 2129/04* (2013.01)

(58) Field of Classification Search
CPC ...... F16D 65/54; F16D 65/567; F16D 55/226; F16D 55/2265; F16D 55/227; F16D 55/22655; F16D 2055/0016; F16D 2055/007; F16D 2127/02; F16D 2129/02; F16D 2129/04; F16D 2125/36; F16D 2125/40; F16D 2121/24; B60T 1/065; B60T 13/741
USPC .................................... 188/72.3, 71.8, 196 P
See application file for complete search history.

(56) References Cited

U.S. PATENT DOCUMENTS

| | | | |
|---|---|---|---|
| 3,376,959 A | 4/1968 | Holcomb, Jr. et al. | |
| 3,497,036 A | 2/1970 | Seip | |
| 4,310,076 A | 1/1982 | Ikeda | |
| 4,382,491 A * | 5/1983 | Chun | F16D 55/22655 188/196 P |
| 4,491,204 A | 1/1985 | Dirauf et al. | |
| 4,741,419 A | 5/1988 | Rath | |
| 5,257,679 A * | 11/1993 | Weiler | F16D 55/228 188/73.32 |
| 5,875,873 A * | 3/1999 | Kay | F16D 65/0978 188/73.38 |
| 5,947,234 A * | 9/1999 | Shimazaki | F16D 65/0977 188/73.38 |
| 10,563,713 B2* | 2/2020 | Fricke | F16D 65/0068 |
| 2003/0136617 A1 | 7/2003 | Gherardi et al. | |
| 2004/0256183 A1* | 12/2004 | Barbosa | F16D 65/18 188/73.38 |
| 2008/0296104 A1* | 12/2008 | Wen | F16D 55/228 188/73.38 |
| 2010/0276232 A1* | 11/2010 | Keller | F16D 65/0977 188/73.31 |
| 2012/0186917 A1 | 7/2012 | Gutelius et al. | |
| 2015/0001010 A1* | 1/2015 | Liao | F16D 65/18 188/72.3 |
| 2015/0129373 A1* | 5/2015 | Hirotomi | B62L 3/00 188/26 |
| 2015/0192180 A1 | 7/2015 | Kloos | |
| 2015/0308524 A1* | 10/2015 | Nakakura | B62L 1/00 188/71.1 |
| 2016/0003315 A1 | 1/2016 | Crippa et al. | |

FOREIGN PATENT DOCUMENTS

| | | | | |
|---|---|---|---|---|
| DE | 4304616 A1 | 8/1994 | | |
| DE | 4430956 A1 | 3/1996 | | |
| DE | 102012006083 A1 | 9/2013 | | |
| DE | 102012102585 A1 | 9/2013 | | |
| DE | 102015109540.8 | 6/2015 | | |
| DE | 202016102686 U1 * | 8/2016 | ............ | F16D 55/00 |
| DE | 102016104970 A1 | 12/2016 | | |
| EP | 0076202 A1 | 4/1983 | | |
| JP | 09210104 A | 8/1997 | | |
| JP | 2005221017 A | 8/2005 | | |
| JP | 2012189188 A | 10/2012 | | |
| WO | 2016202778 A1 | 12/2016 | | |

* cited by examiner

DISC BRAKE, IN PARTICULAR FOR UTILITY VEHICLES

CROSS-REFERENCE TO RELATED APPLICATIONS

This application is a continuation of U.S. application Ser. No. 16/078,410, filed Aug. 21, 2018, which was a 371 National Stage Application that claimed the benefit of PCT Application PCT/EP2017/000412, filed Apr. 4, 2017, which claimed the benefit of EP 102016004516.7, filed Apr. 13, 2016. The entire disclosure of each of the above applications is incorporated herein by reference.

TECHNICAL FIELD

The invention relates to a disc brake, in particular for utility vehicles, with a brake disc, a first brake lining on a first side of the brake disc and a second brake lining on a second side of the brake disc opposite the first side. This is preferably a sliding caliper disc brake.

BACKGROUND

Disc brakes of the above-mentioned type are known. The problem often arises during operation that the two brake linings do not move far enough away from the brake disc after release of the brake. In other words, there is no "clearance". On the contrary, it occurs that one of the two brake linings or both brake linings bears/bear against the brake disc in a grinding manner.

Attempts have already been made to overcome the above problem. To this end, for example, in the case of a sliding caliper disc brake, the first (reaction-side) brake lining has been coupled via a magnet or a tension spring in the axial direction with the brake caliper. An example is described in DE 10 2012 102 585 B4. Solutions are also known where the second (application-side) brake lining has been coupled via a magnet or a tension spring axially to the brake application device of the brake. However, these solutions only function if and when the caliper or the application device is reset in the event of release of the brake. It is only then that the respective brake lining is lifted sufficiently far from the brake disc.

SUMMARY OF THE INVENTION

In view of the above problems, the object on which the invention is based is to further develop the disc brake of the above-mentioned type such that at least one of the two brake linings is lifted sufficiently far from the brake disc in the event of release of the brake such that a residual grinding moment is at least reduced, if not eliminated.

According to the invention, the set object is achieved in the case of a disc brake of the above-mentioned type by a spreading device which generates a force which moves the first and the second brake lining away from one another.

The invention is based on the knowledge that a spread of the two brake linings leads to both brake linings generally lifting off from the brake disc so that no residual grinding occurs any more. A spread counteracts static friction counter to the lifting up of the brake linings. External influences such as impacts and vibrations support the spreading effect and lead to centering of the brake linings. Because the spreading force acts on both sides of the brake disc, clearance of equal size arises on both sides. However, even if only one of the two brake linings lifts off from the brake disc, the residual grinding is at least reduced.

The spreading device is, according to the invention, preferably elastic. In other words, an elastic restoring force is used to spread the two brake linings.

According to a further preferred embodiment of the invention, the spreading device can have a spring wire or a spring sheet. This solution is mechanically particularly simple and robust.

The spreading device can further preferably be formed at least in portions by a helical spring. Such a helical spring can generate the above-mentioned elastic restoring force in the case of load, for example, in the sense of axial compression.

According to the invention, the spreading device is further preferably supported on a backing plate of the first and/or the second brake lining and/or on a retainer spring of the first and/or the second brake lining.

In the case of this type of support, reliable spreading is ensured without the braking process itself being impaired.

According to a further preferred embodiment of the invention, it is provided that the spreading device is retained on a retainer device of the first and/or the second brake lining.

An axial coupling, resulting from the retainer, of the spreading device with the retainer device, even if it is only based on frictional locking, can contribute to, as a result of the spreading, not only one of the two brake linings being lifted up from the brake disc, rather both brake linings being moved away from the brake disc so that the residual grinding is eliminated. It is furthermore possible to spread the brake linings on the different sides with differing spreading forces.

According to the invention, it is further preferably provided that the force generated by the spreading device is adjustable.

As a result of this, proper account can be taken of the respective operating conditions. The adjustability can be achieved, for example, by corresponding configuration of the holder on the retainer device.

In addition to the disc brake explained above, the invention creates a disc brake, in particular for utility vehicles, with a brake disc, a first brake lining on a first side of the brake disc, a second brake lining on a second side of the brake disc opposite the first side, a brake carrier and a brake caliper which is mounted in a floating manner, wherein the disc brake has a restoring device which generates a force which moves the brake caliper in relation to the brake carrier in the direction opposite to a direction of movement of the brake caliper when applying the brake.

The restoring device can be provided additionally or alternatively to the above-mentioned spreading device in the case of the disc brake.

The restoring device brings about a restoring of the brake caliper when the brake is released, as a result of which the brake caliper reliably creates enough space so that at least the reaction-side first brake lining can lift up from the brake disc without any problems. This measure alone leads in particular in the case of disc brakes with a restoring device on the application device to sufficient space being available for lifting up the reaction-side first and/or the application-side second brake lining from the brake disc, which in most cases already leads without further measures to the reaction-side first and/or application-side second brake lining lifting up sufficiently from the brake disc in order to at least reduce, if not eliminate, the residual grinding moment.

In interaction with the spreading device described above, the restoring device according to the invention can reliably minimize, if not even eliminate, the residual grinding.

The restoring device for the brake caliper preferably lies according to the invention on an application side of the brake. The application side is namely better protected from environmental influences by the caliper housing than the reaction side.

For further protection of the restoring device, it is preferably provided according to the invention that the brake caliper is mounted on a bolt displaceably in relation to the brake carrier and the restoring device lies at least partially within the bolt.

On the same grounds as in the case of the spreading device, the restoring device can according to the invention preferably have at least one elastic element such as, for example, a compression spring.

According to a particularly preferred embodiment of the invention, the restoring device has a spring element, preferably a compression spring element, which is supported, facing the brake disc, on a first stop, wherein the first stop is coupled axially to the brake caliper at least in terms of a movement toward the brake disc, and which is supported, facing away from the brake disc, on a second stop, which is coupled axially to the bolt at least in terms of a movement away from the brake disc.

As a result of this configuration, the restoring device configured as a (compression) spring element acts on the application side like a compression spring and moves, in the event of release of the brake, the brake caliper in one direction, which is opposite to its movement for compensation of lining wear. As a result of this, the above-mentioned space is created for lifting up the reaction-side first brake lining and/or the application-side second brake lining.

According to the invention, the first stop is formed on a cup and/or the second stop is formed on a disc.

The cup can, according to the invention, preferably have at least one through-opening through which a lug of the disc extends.

The invention is explained in greater detail below on the basis of preferred exemplary embodiments with reference to the enclosed drawings with further details.

The drawings are provided herewith for purely illustrative purposes and are not intended to limit the scope of the present invention.

DETAILED DESCRIPTION OF THE DRAWINGS

Figure 1:
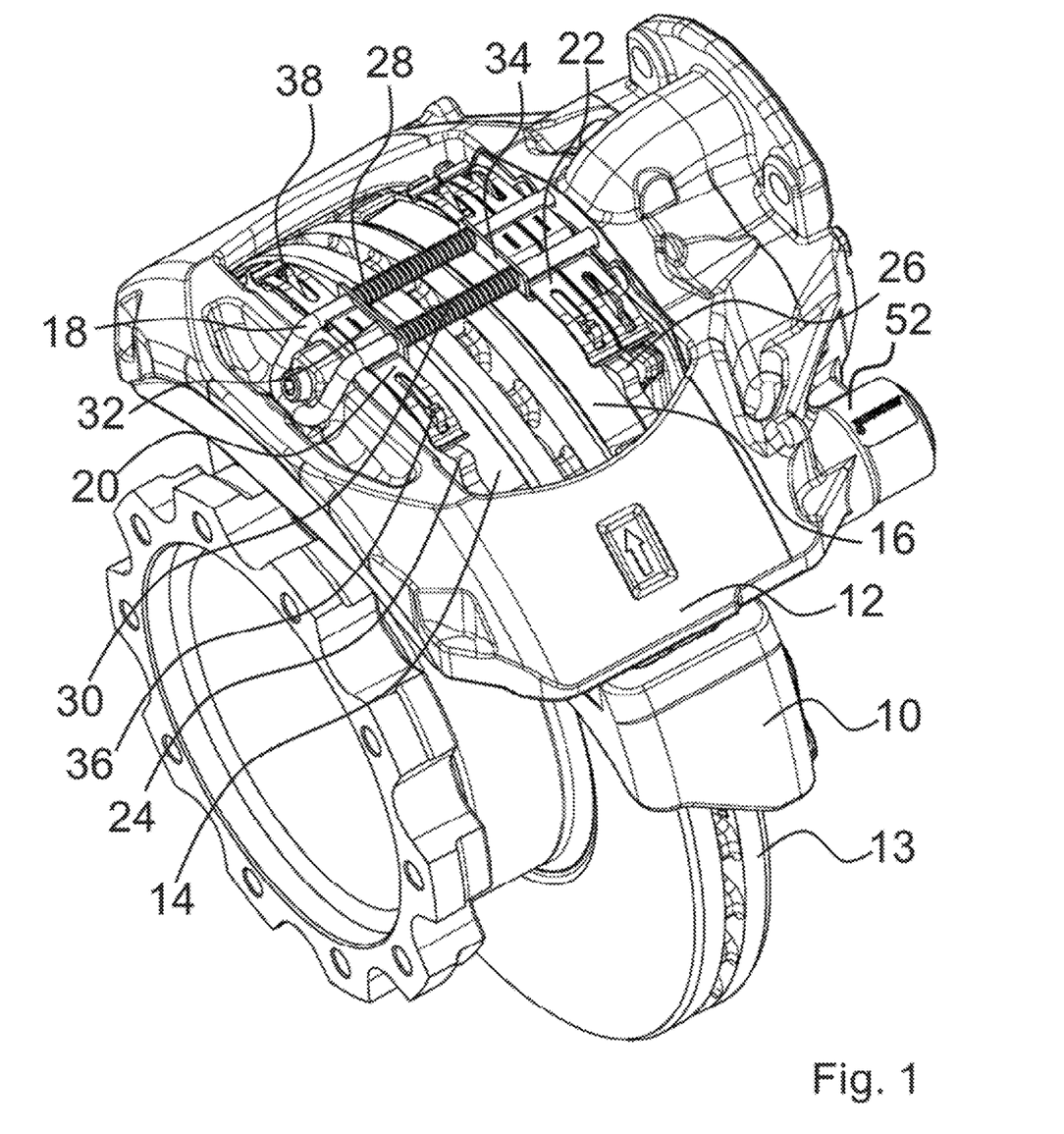
FIG. 1 shows a perspective view of a sliding caliper disc brake according to a first exemplary embodiment of the invention.
Figure 2:
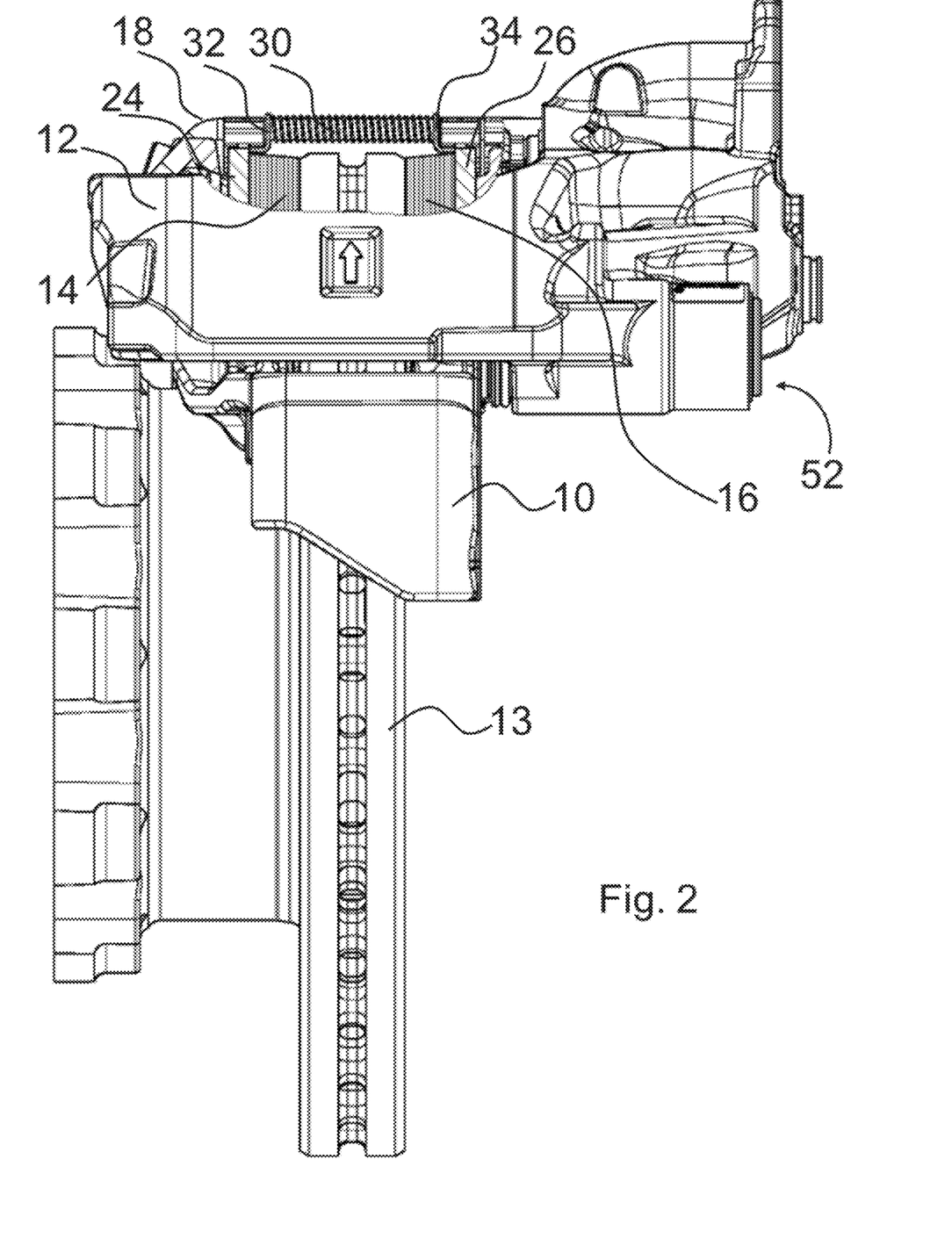
FIG. 2 shows a side view of the brake according to FIG. 1.
Figure 3:
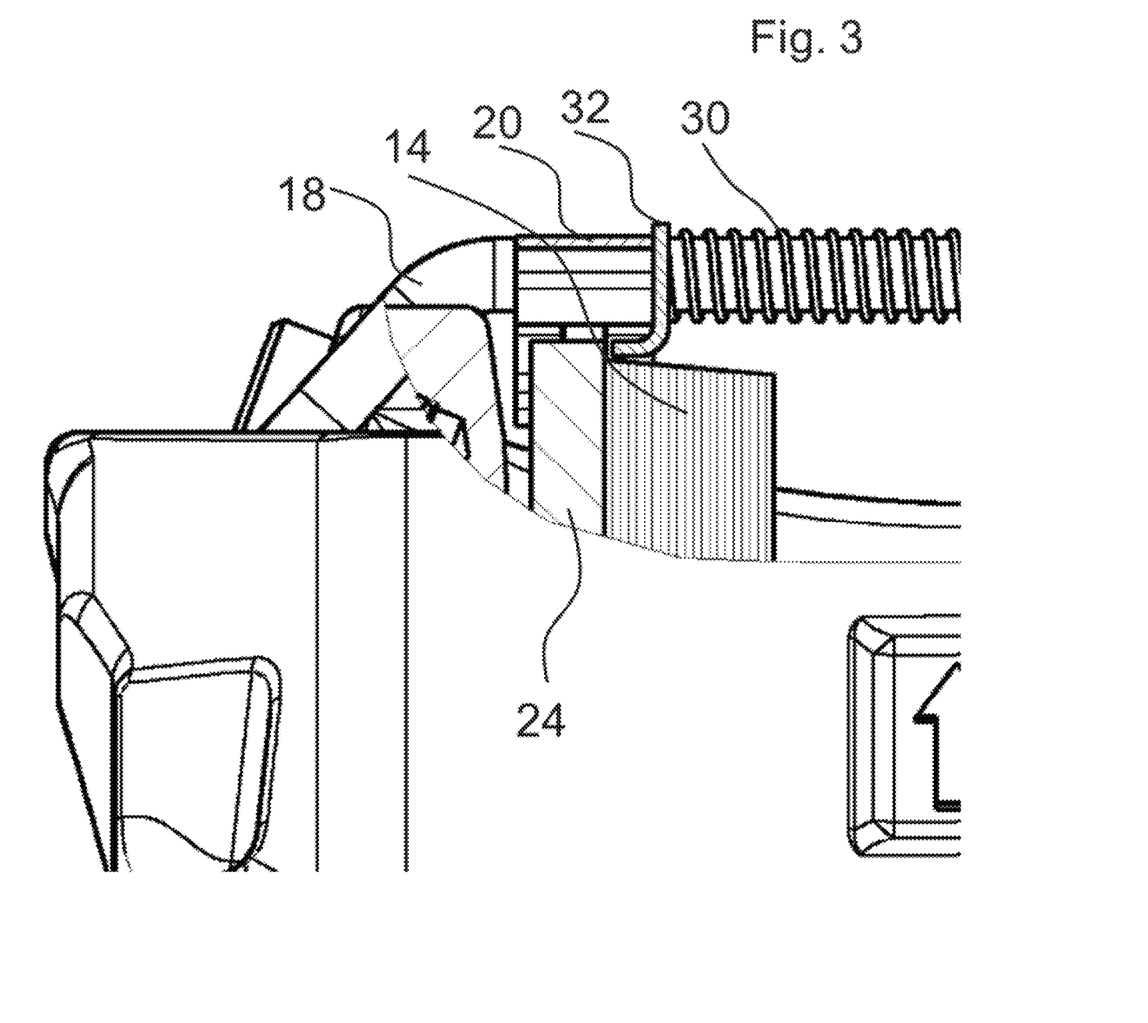
FIG. 3 shows a detailed view from FIG. 2.

The brake according to FIGS. 1 to 3 includes a brake carrier 10, a brake caliper 12 mounted in a floating manner, a first brake lining 14 arranged on a first side of a brake disc 13 and a second brake lining 16 arranged on a second side of brake disc 13. The first side is what is known as the reaction side, the second side is the application side.

First and second brake lining 14, 16 are retained via a retainer bracket 18 via retainer springs 20, 22. Retainer springs 20, 22 bear against backing plates 24, 26 of first or second brake lining 14, 16.

In the case of the brake according to FIGS. 1 to 3, a spreading device is provided which includes two springs 28, 30 which are supported on two sheets 32, 34. Springs 28, 30 are helical springs which are subject to pressure. Sheets 32, 34 are embodied to be L-shaped.

FIG. 3 shows that part of the spreading device located on the left in FIG. 2. For the purpose of spreading, spring 30 pushes against sheet 32 which itself bears against retainer spring 20. Retainer spring 20 is itself coupled axially to first brake lining 14 via lugs 36, 38, which is why the restoring force of springs 28, 30 acts axially on first brake lining 14. The configuration of the spreading device is, on the side located on the right in FIG. 2, embodied to be symmetrical with respect to the left side so that the restoring force of springs 28 and 30 also acts on second brake lining 16. This restoring force brings about that first brake lining 14 and second brake lining 16 are moved away from one another, as a result of which they lift up from the brake disc. Particularly if the application device, not represented in the drawing, of the brake has a restoring device, the application device is restored in the event of release of the brake, as a result of which space is created for lifting up application-side second brake lining 16. In interaction with the spreading device, first brake lining 14 will also lift up, as a result of which all residual grinding both of first and second brake lining 14, 16 on the brake disc is reliably eliminated.

In FIGS. 4 to 10, identical reference numbers designate the same components as in FIGS. 1 to 3.

Figure 4:
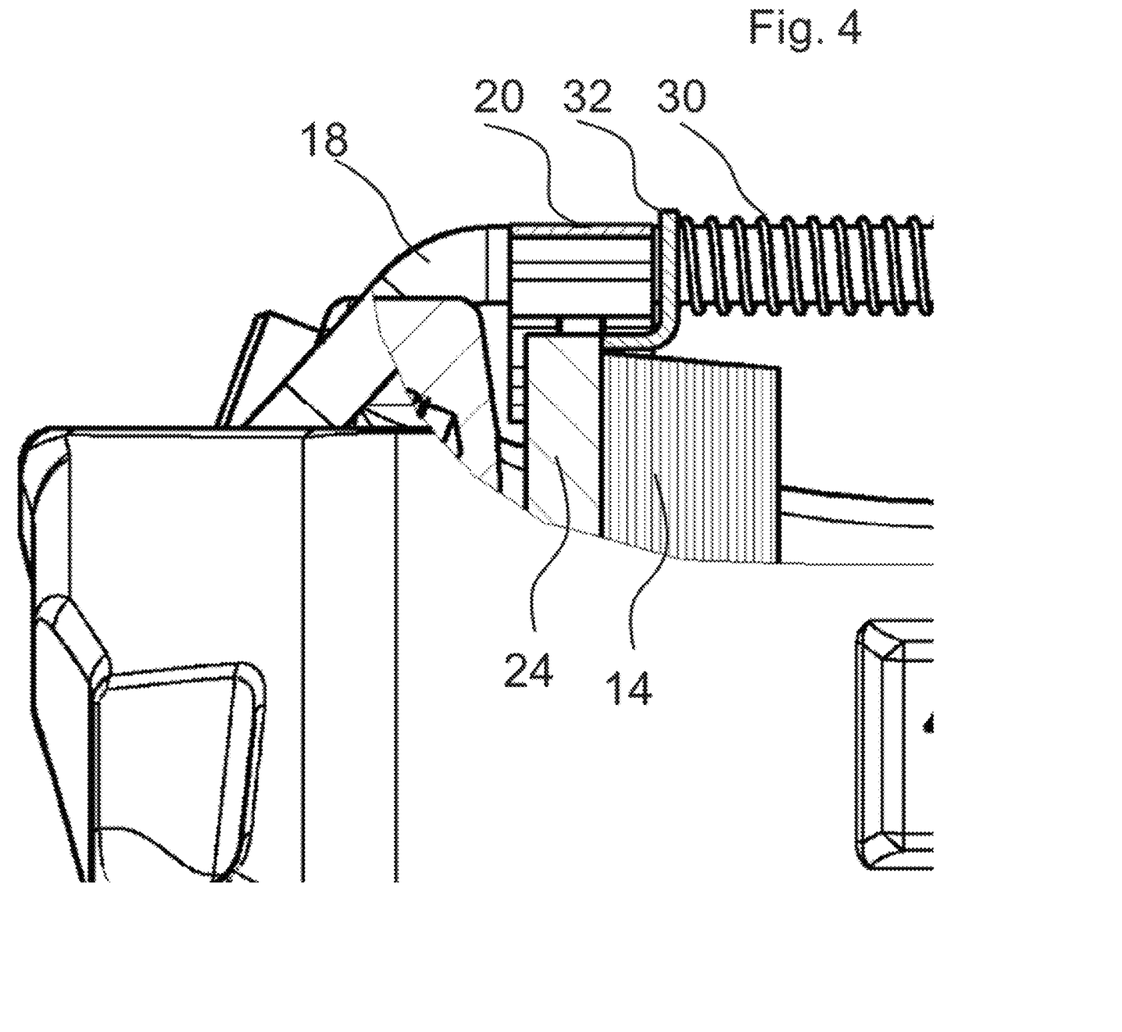
FIG. 4 shows the same view as FIG. 3, but of a second exemplary embodiment.

FIG. 4 shows the same detail as FIG. 3, but of a second exemplary embodiment of the invention. According to this, sheet 32 is not supported, for example, on retainer spring 20, but rather on backing plate 24. It applies in turn that the spreading device is configured to be symmetrical, which is why sheet 34 is also supported on backing plate 26.

Figure 5:
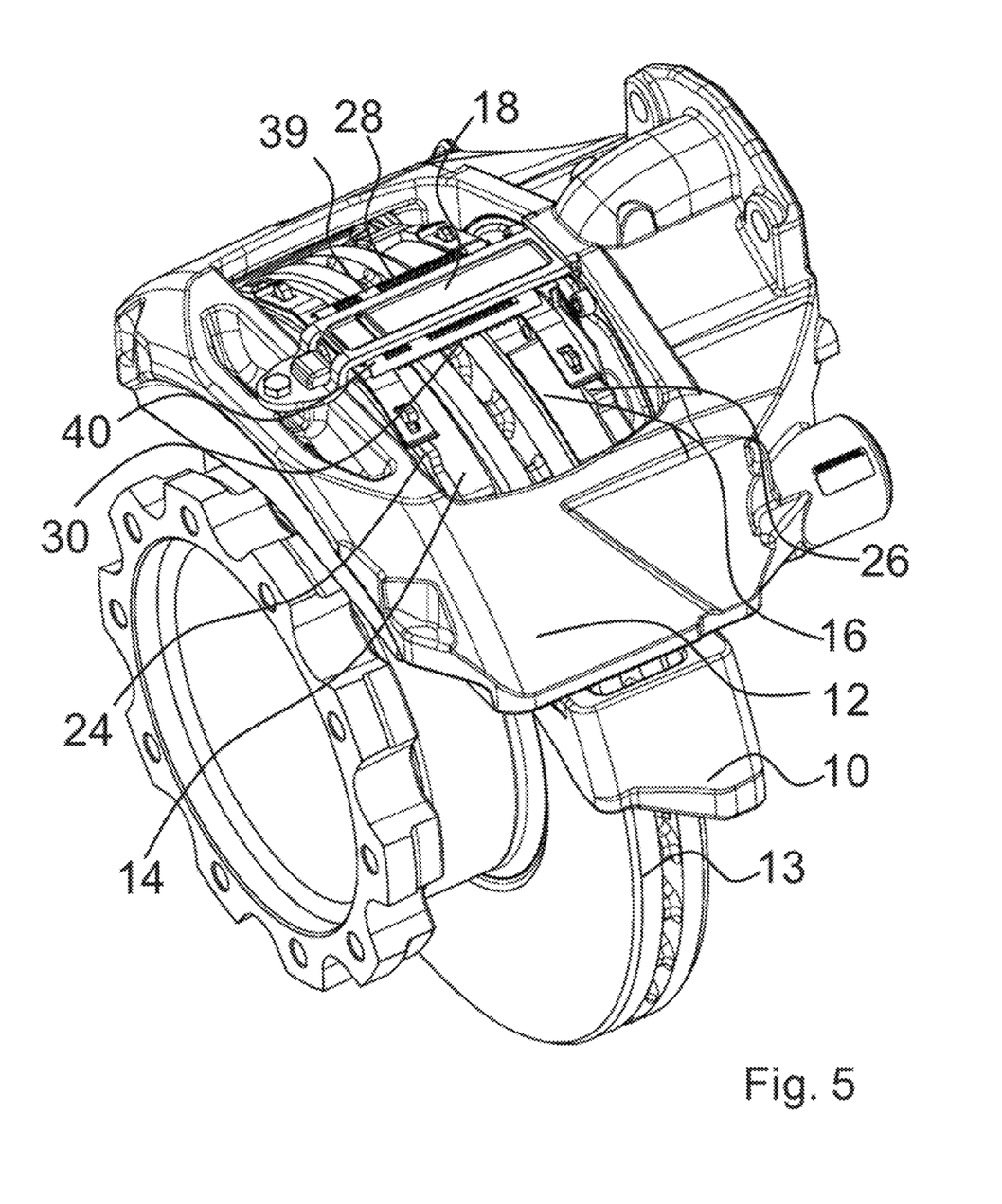
FIG. 5 shows a perspective view of a sliding caliper disc brake according to a third exemplary embodiment of the invention.
Figure 6:
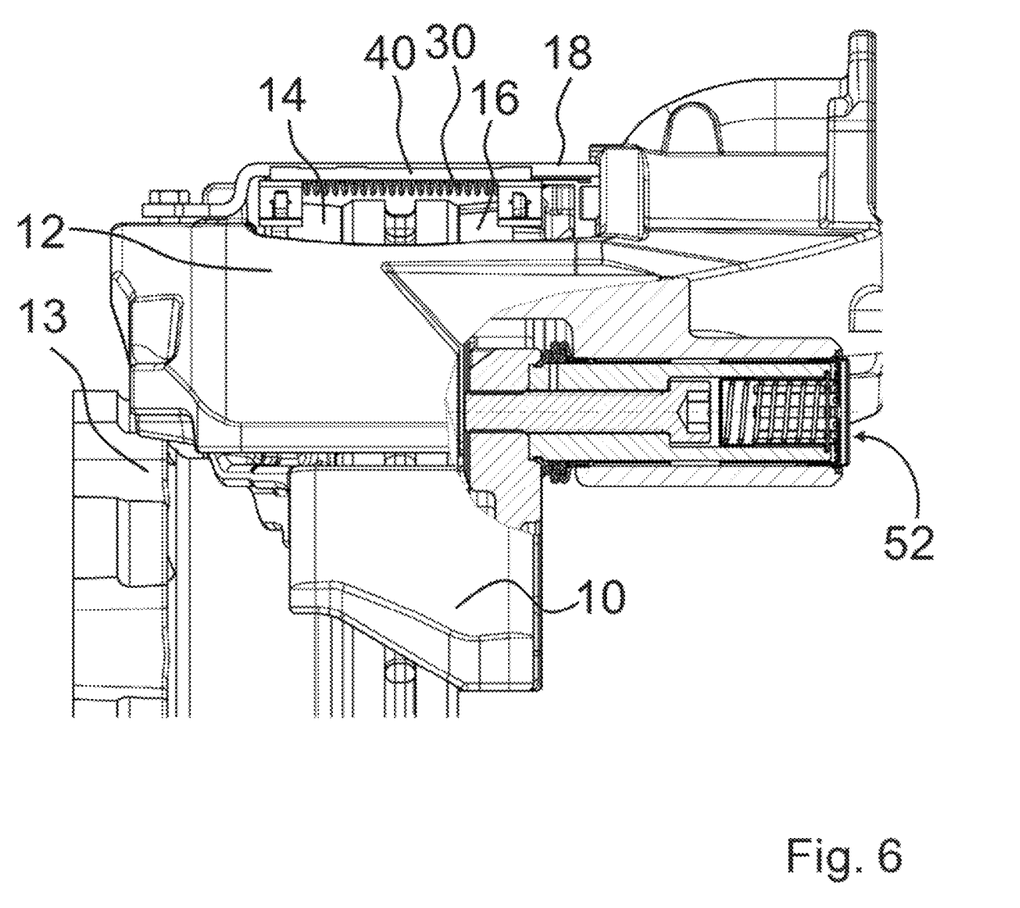
FIG. 6 shows a side view of the brake according to FIG. 5.

The third exemplary embodiment of the invention shown in FIGS. 5 and 6 corresponds substantially to the exemplary embodiments according to FIGS. 1 to 4, wherein, however, springs 28, 30 do not, as according to FIGS. 1 to 4, loop around retainer bracket 18 or in each case a rib of retainer bracket 18, but rather are arranged next to the retainer bracket. They are held with holders 39, 40 on retainer bracket 18. Holders 39, 40 can indeed be embodied in two parts, but they are preferably in one piece. The holder generated as a result does not necessarily have to be fastened to retainer bracket 18. On the contrary, another type of fastening is also possible. Springs 28, 30 can push both directly and indirectly on retainer springs 20, 22 and/or backing plates 24, 26. This also applies to the exemplary embodiments according to FIGS. 1 to 4.

Figure 7:
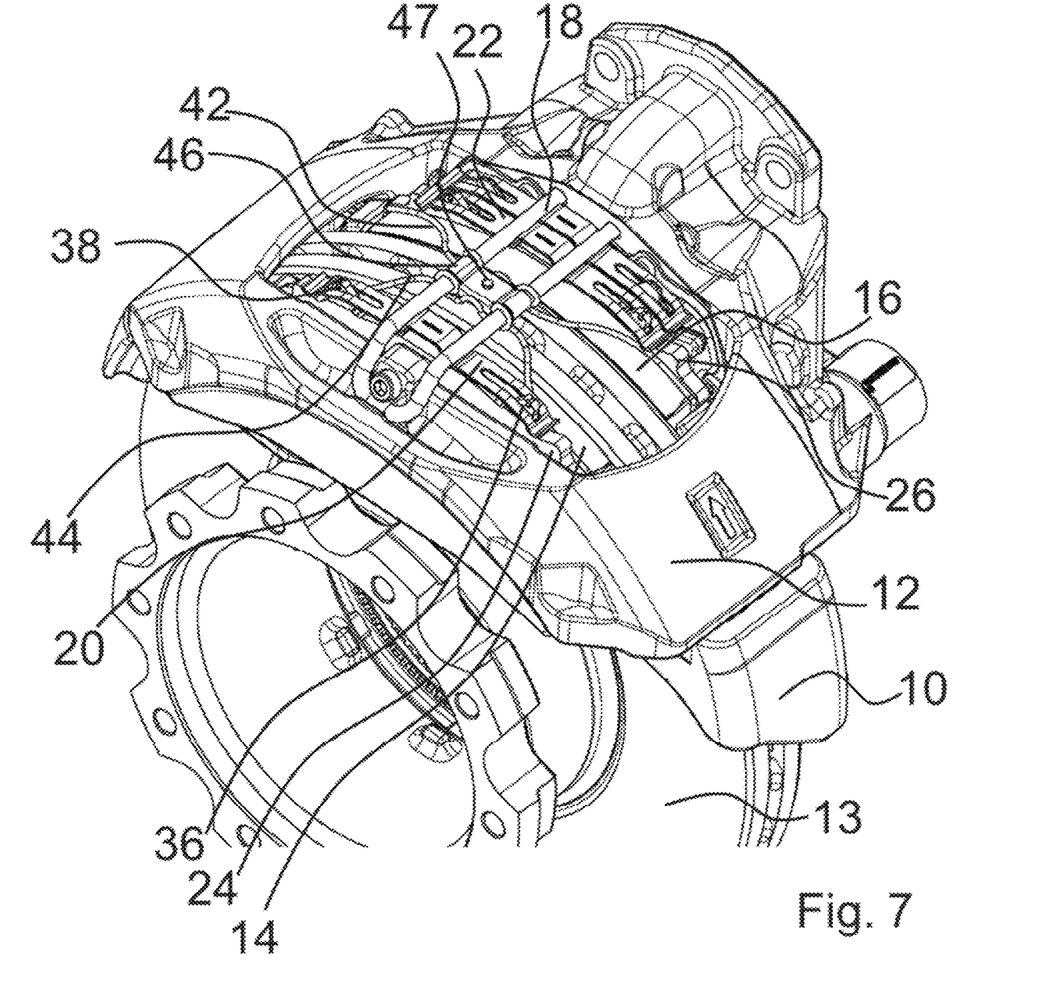
FIG. 7 shows a perspective view of a sliding caliper disc brake according to a fourth exemplary embodiment of the invention.
Figure 8:
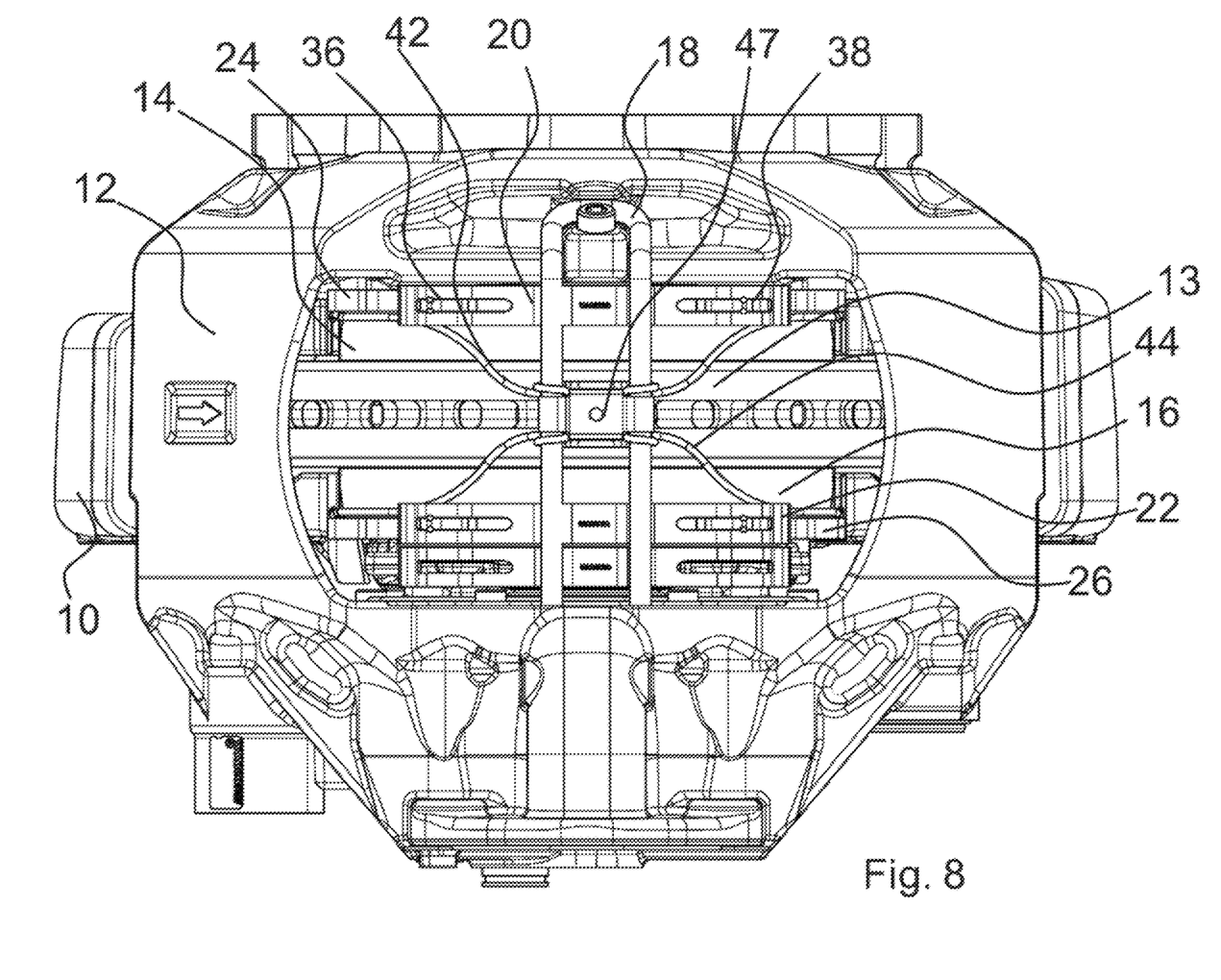
FIG. 8 shows a top view of the brake according to FIG. 7.

FIGS. 7 and 8 show a fourth exemplary embodiment of the invention. In the case of this exemplary embodiment, the spreading device includes two spring wires which jointly have approximately the contour of an "X". They are designated by reference numbers 42, 44. For the purpose of holding, they enclose in each case with one rotation a rib of retainer bracket 18. At their ends, they are supported in each case on backing plates 24, 26 of first or second brake lining 14, 16. In the center, they are supported axially on a joint abutment 46. A screw 47 which on the one hand brings about the fixing of abutment 46 on retainer bracket 18 and on the other hand offers the possibility of targeted setting of the spring pretensioning on both sides of brake disc 13 is located in the center of abutment 46. While springs 28, 30 are under pressure or compressed and thus generate the elastic restoring force for spreading, spring wires 42, 44 involve loading by bending. They otherwise, however, bring about the same spread as springs 28, 30.

The position of abutment 46 which encloses retainer bracket 18 can be set in a targeted manner with screw 47. Here, abutment 46 is positioned in a frictionally locking manner on retainer bracket 18. If abutment 46 is positioned eccentrically and fixed with screw 47, different spring pretensioning arises on the one hand on the application side and on the other hand on the reaction side. An imbalance of forces which is set in a targeted manner is therefore present. In the case of a positive-locking connection between abutment 46 and retainer bracket 18, in turn a balance of forces, i.e. the same spring pretensioning on both sides, is achieved which leads nevertheless to an imbalance of forces as a result of the displacement of brake caliper 12 in the event of lining wear.

Figure 9:
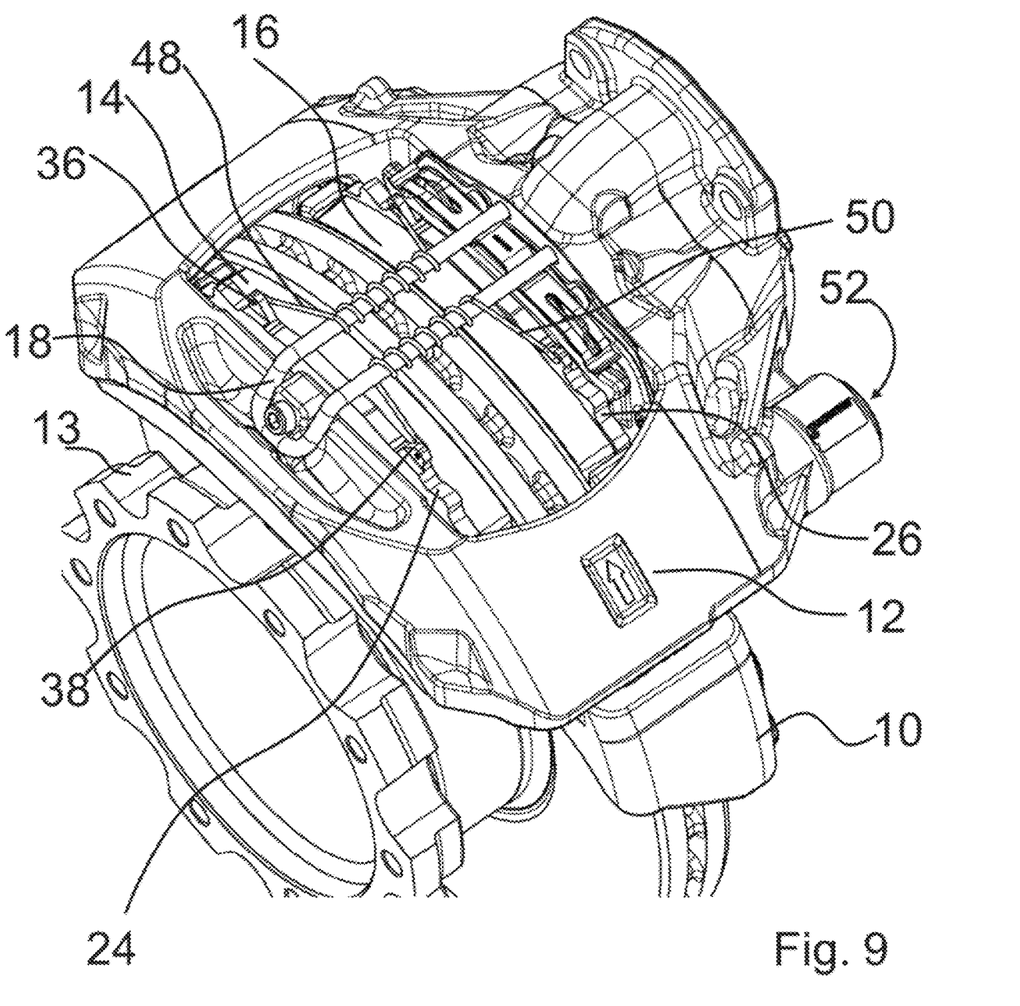
FIG. 9 shows a perspective view of a sliding caliper disc brake according to a fifth exemplary embodiment of the invention.
Figure 10:
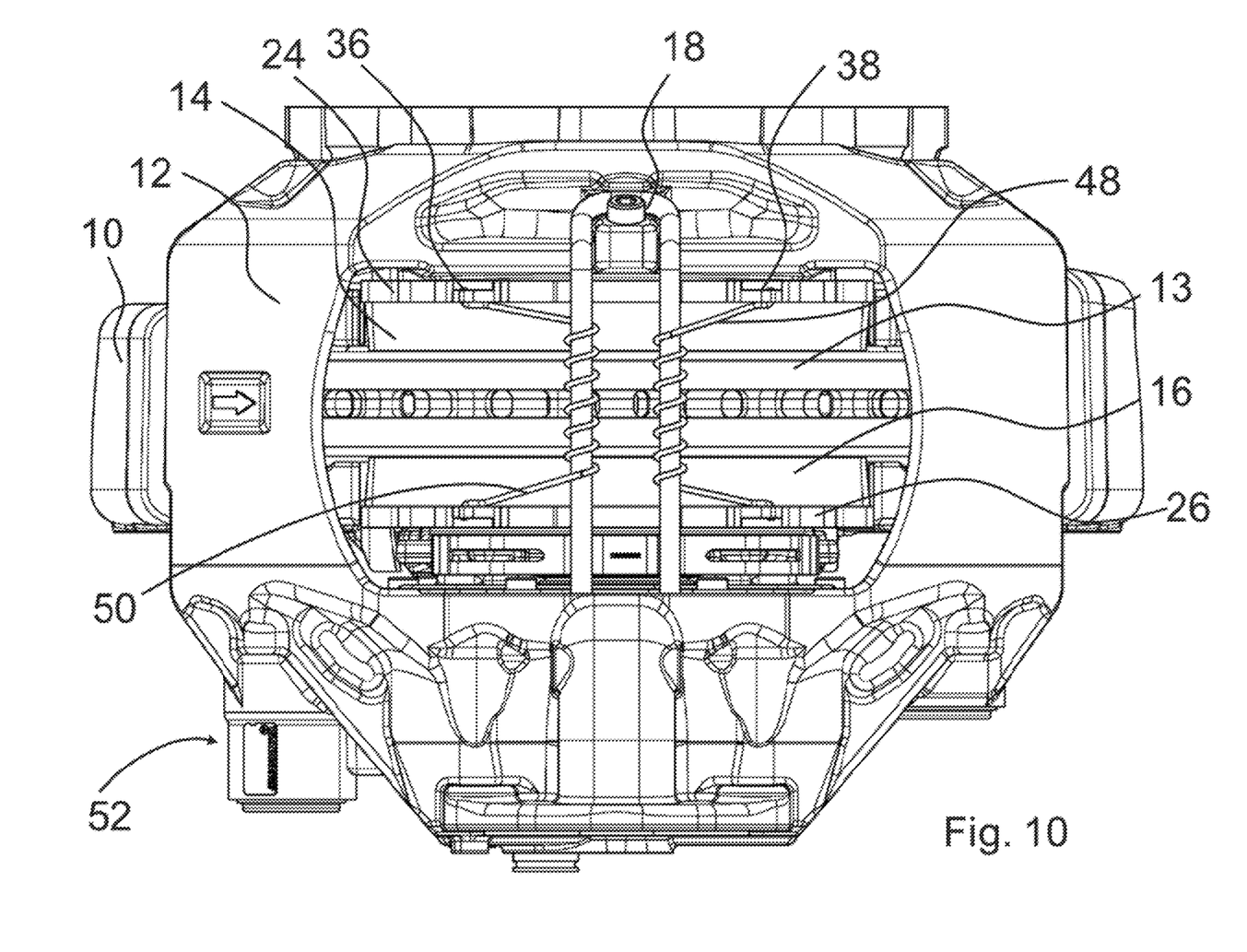
FIG. 10 shows a top view of the brake according to FIG. 9.

In the case of the fifth exemplary embodiment of the invention shown in FIGS. 9 and 10, springs 48, 50 which are part of the spreading device are partially under bending load and partially under pressure load in order to generate the restoring force which serves the purpose of spread. They loop multiple times around the ribs of retainer bracket 18. At their ends, they are supported on lugs of backing plates 24, 26, of which two are designated by reference numbers 36, 38, cf. also FIG. 1.

Figure 11:
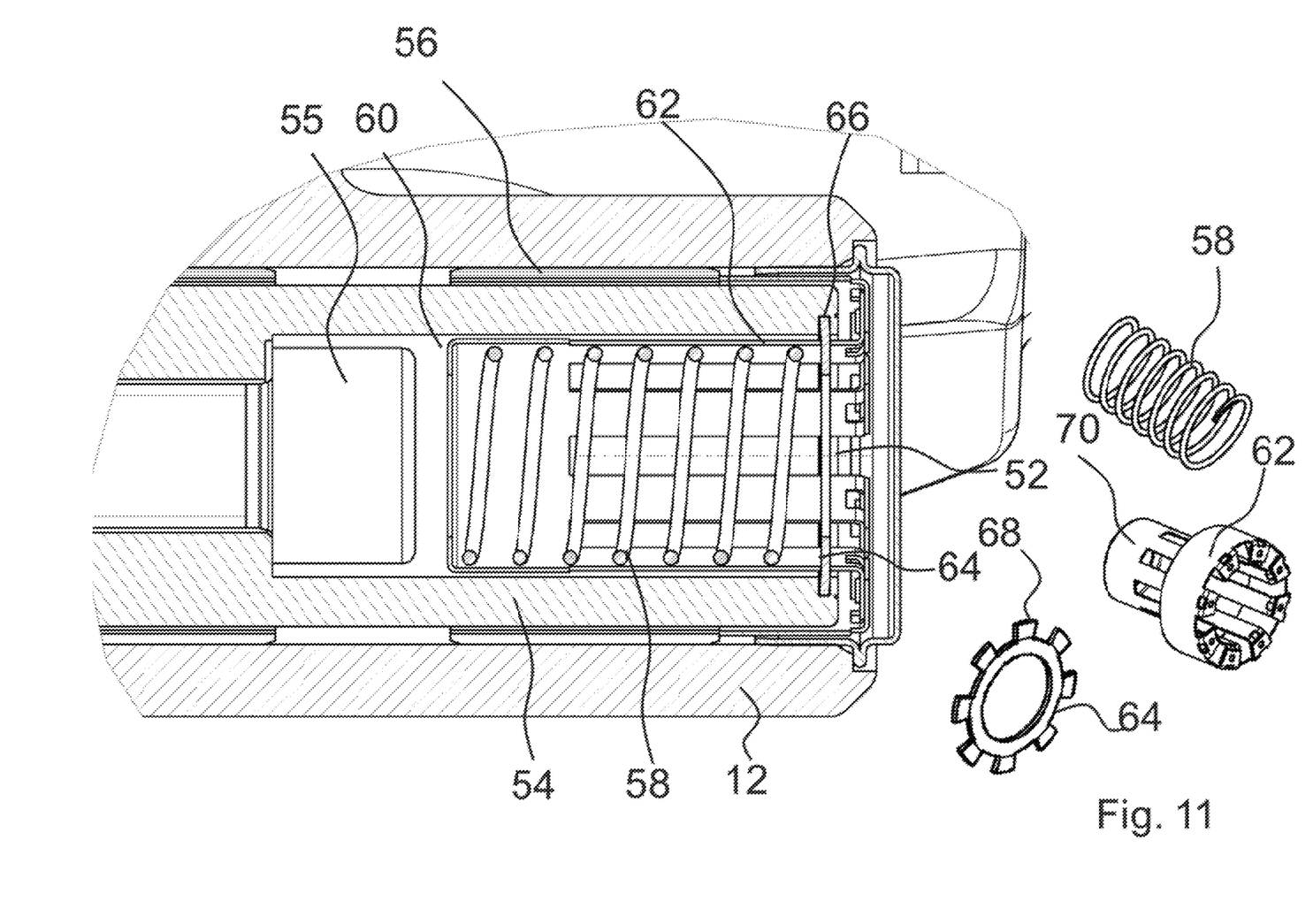
FIG. 11 shows a schematic partial view of an exemplary embodiment for a restoring device of a sliding caliper disc brake according to the invention.

FIG. 11 schematically shows an exemplary embodiment of a restoring device for resetting a brake caliper 12 in relation to brake carrier 10 in the event of release of the brake. The restoring device shown in FIG. 11 is designated in general by reference number 52 in FIG. 1. It lies within a bolt 54 on which brake caliper 12 is mounted in a displaceable or floating manner. Bolt 54 is fastened via a screw 55 to brake carrier 10. A bearing bush 56 which is coupled to brake caliper 12 in the axial direction in a frictionally locking manner and is therefore displaced together with it in relation to bolt 54 lies between brake caliper 12 and bolt 54. Bearing bush 56 can also be coupled to brake caliper 12 in a positive-locking manner in the axial direction.

The restoring device includes a compression spring 58 which is supported, on the left hand side in FIG. 11, on the base of a cup 62 which represents a first stop 60. On the side shown on the right in FIG. 11, spring 58 is supported on a serrated washer which therefore forms a second stop 64.

Cup 62 is coupled in the axial direction to bearing bush 56 and therefore to brake caliper 12. The serrated washer which represents second stop 64 is coupled in the axial direction to bolt 54. It is namely pressed into a groove 66 of bolt 54. The serrated washer which serves as a second stop 64 has lugs, of which one is designated by way of example by reference number 68. The lugs are guided in through-openings in cup 62, of which one is designated by way of example by reference number 70.

As a result of this construction, compression spring 58 arranged on the reaction side of the brake, which is under pressure in accordance with its designation, acts like a tension spring which "pulls" brake caliper 12 to the left in FIG. 11 and therefore creates space for lifting up first brake lining 14 when the brake is released. Particularly if one of the spreading devices explained in detail above is provided, it can as a result be brought about that both first and second brake lining 14, 16 lift off from the brake disc so that any residual grinding moment is eliminated.

While the above description constitutes the preferred embodiments of the present invention, it will be appreciated that the invention is susceptible to modification, variation and change without departing from the proper scope and fair meaning of the accompanying claims.

The invention claimed is:

1. A disc brake for utility vehicles comprising:
   a brake disc (13);
   a first brake lining (14) on a first side of the brake disc (13);
   a second brake lining (16) on a second side of the brake disc (13) opposite the first side; and
   a spreading device (28, 30; 42, 44; 48, 50), wherein the spreading device (**28, 30;
   42, 44; 48, 50) is configured to generate a force to move the first brake lining (14) and the second brake lining (16) away from one another, wherein the spreading device (28, 30; 42, 44; 48, 50) includes two elastic elements, both of which are retained on a common retainer bracket (18) extending across the first and the second brake lining (14, 16**);
   wherein the two elastic elements each bear directly against first and second sheets (32, 34), wherein the first and second sheets are disposed at opposite ends of each of the two elastic elements, wherein the first sheet (32) is disposed axially between the elastic elements and a first backing plate (24) of the first brake lining (14), and the second sheet (34) is disposed axially between the elastic elements and a second backing plate (26) of the second brake lining.

2. The disc brake of claim 1, wherein the first sheet (32) bears against a first retainer spring (20) and the second sheet (34) bears against a second retainer spring (22), wherein the first retainer spring (20) is coupled to the first brake lining (14) and the second retainer spring (22) is coupled to the second brake lining (16).

3. The disc brake of claim 1, wherein the first sheet (32) bears against the a first backing plate (24) of the first brake lining (14) and the second sheet (34) bears against the a second backing plate (26) of the second brake lining (16).

4. The disc brake as claimed in claim 1, wherein the spreading device (28, 30; 48, 50) is formed at least in portions by a helical spring.

5. The disc brake as claimed in claim 1 3, wherein the spreading device (28, 30; 42, 44; 48, 50) is supported, via the first sheet and/or the second sheet, on at least one of the first and second brake linings (14, 16) via a backing plate (24, 26) or a retainer spring (20, 22).

6. The disc brake as claimed in claim 1, wherein the force generated by the spreading device is adjustable.

7. A disc brake for commercial vehicles, comprising:
   a brake disc (13);

a first brake lining (14) on a first side of the brake disc (13);

a second brake lining (16) on a second side of the brake disc (13) opposite the first side;

a brake carrier (10);

a brake caliper (12) mounted in a floating manner;

a spreading device (28, 30; 42, 44; 48, 50), wherein the spreading device (28, 30;

42, 44; 48, 50) is configured to generate a force to move the first brake lining (14) and the second brake lining (16) away from one another, wherein the spreading device (28, 30;

42, 44; 48, 50) includes two elastic elements, both of which are retained on a common retainer bracket (18) extending across the first and the second brake lining (14, 16); and a restoring device (52), wherein the restoring device (52) is configured to generate a force to move the brake caliper (12) in relation to the brake carrier (10) in the direction opposite to a direction of movement of the brake caliper (12);

wherein the retainer bracket (18) extends axially across the first and the second brake lining (14, 16)i wherein the brake caliper (12) is mounted on a bolt (54) displaceably in relation to the brake carrier (10), and the restoring device (52) includes a spring arranged entirely inside the bolt;

wherein the restoring device (52) has a compression spring (58), the compression spring (58) being supported on a first stop (60) on a side facing the brake disc, wherein the first stop (60) is coupled axially to the brake caliper (12) at least in terms of a movement toward the brake disc (13), and the compression spring (58) being supported on a second stop (64) on a side facing away from the brake disc, wherein the second stop (64) is coupled axially to the bolt (54) at least in terms of a movement away from the brake disc (13).

8. The disc brake as claimed in claim 7, wherein the restoring device (52) is on the second side of the brake disc (13).

9. The disc brake as claimed in claim 7, wherein the restoring device (52) has at least one elastic element.

10. The disc brake as claimed in claim 7, wherein the first stop (60) is formed on a cup (62) or the second stop (64) is formed on a disc.

11. The disc brake as claimed in claim 10, wherein the cup (62) has at least one through-opening (70) through which a lug (68) of the disc extends.

12. The disc brake as claimed in claim 9, wherein the at least one elastic element is the compression spring (58).

13. The disc brake as claimed in claim 7, wherein the first stop (60) is formed on a cup (62) and the second stop (64) is formed on a disc.

14. A disc brake for utility vehicles comprising:

a brake disc (13);

a first brake lining (14) on a first side of the brake disc (13);

a second brake lining (16) on a second side of the brake disc (13) opposite the first side; and a spreading device (28, 30; 42, 44; 48, 50), wherein the spreading device (28, 30;

42, 44; 48, 50) is configured to generate a force to move the first brake lining (14) and the second brake lining (16) away from one another, wherein the spreading device (28, 30;

42, 44; 48, 50) includes a first elastic element and a second elastic element, both of which are retained on a common retainer bracket (18) extending across the first and the second brake lining (14, 16);

wherein the retainer bracket (18) extends axially across the first and the second brake lining (14, 16);

wherein the first and second elastic elements each bear directly against first and second sheets (32, 34), wherein the first and second sheets are disposed at opposite ends of each of the first and second elastic elements, wherein the first sheet is disposed axially between the first and second elastic elements and a first backing plate of the first brake lining, and the second sheet is disposed axially between the first and second elastic elements and a second backing plate of the second brake lining.

15. The disc brake of claim 14, wherein the first sheet (32) bears against a first retainer spring (20) and the second sheet (34) bears against a second retainer spring (22), wherein the first retainer spring (20) is coupled to the first brake lining (14) and the second retainer spring (22) is coupled to the second brake lining (16).

16. The disc brake of claim 14, wherein the first sheet (32) bears against the first backing plate (24) of the first brake lining (14) and the second sheet (34) bears against the second backing plate (26) of the second brake lining (16).

* * * * *